United States Patent
Naylor et al.

(10) Patent No.: US 10,972,548 B2
(45) Date of Patent: Apr. 6, 2021

(54) DISTRIBUTED SYSTEM DEPLOYMENT

(71) Applicant: International Business Machines Corporation, Armonk, NY (US)

(72) Inventors: Alexander John Naylor, Newbury (GB); Oliver Paul Masters, Birmingham (GB); Samuel Christopher Smith, Eastleigh (GB); Andrew James Dunnings, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/564,266

(22) Filed: Sep. 9, 2019

(65) Prior Publication Data
US 2021/0075866 A1    Mar. 11, 2021

(51) Int. Cl.
*H04W 48/16* (2009.01)
*H04W 36/30* (2009.01)
(Continued)

(52) U.S. Cl.
CPC .............. *H04L 67/141* (2013.01); *G06F 8/63* (2013.01); *H04L 43/0864* (2013.01); *H04L 43/10* (2013.01); *H04L 67/1097* (2013.01)

(58) Field of Classification Search
CPC ...... G06F 3/0604; G06F 3/0655; G06F 3/067; G06F 3/5077; G06F 8/63; H04L 67/141;
(Continued)

(56) References Cited

U.S. PATENT DOCUMENTS

| 7,865,582 B2 | 1/2011 | Santos et al. |
| 2004/0233868 A1* | 11/2004 | Farnham ............... H04W 48/18 370/329 |

(Continued)

FOREIGN PATENT DOCUMENTS

| CN | 106610836 A | 5/2017 |
| CN | 108664378 A | 10/2018 |

OTHER PUBLICATIONS

Yasaki et al., Dynamic Reconfigurable Wireless Connection between Smartphone and Gateway 6 pages (Year: 2015).*
(Continued)

*Primary Examiner* — Thuy Dao
(74) *Attorney, Agent, or Firm* — Peter Edwards

(57) ABSTRACT

A computer-implemented method for configuring deployment of a distributed system across a plurality of machines of a network. The method may include obtaining network information describing network communication characteristics between a plurality of machines of a network. The method may also include obtaining inter-container communication information describing at least one characteristic of communication between pairs of machines of the plurality of machines for a predetermined time period. The method may also include determining a cost function, the cost function mapping a potential container deployment configuration to an expected communication time, based on the network information and the inter-container communication. The method may also include processing the cost function with an optimization algorithm. The method may also include, in response to the processing, identifying a container deployment configuration having an associated cost that meets a cost requirement.

20 Claims, 6 Drawing Sheets

(51) Int. Cl.
*H04W 36/14* (2009.01)
*H04W 84/12* (2009.01)
*H04W 48/18* (2009.01)
*H04L 29/08* (2006.01)
*G06F 8/61* (2018.01)
*H04L 12/26* (2006.01)

(58) Field of Classification Search
CPC . H04L 67/1097; H04L 43/0864; H04L 43/10; H04W 48/16; H04W 48/18; H04W 88/06; H04W 36/30; H04W 36/14; H04W 84/12
See application file for complete search history.

(56) References Cited

U.S. PATENT DOCUMENTS

| | | | |
|---|---|---|---|
| 2010/0177711 A1* | 7/2010 | Gum | H04W 88/06 370/329 |
| 2016/0330277 A1 | 10/2016 | Jain et al. | |
| 2017/0214550 A1 | 7/2017 | Kumar et al. | |
| 2017/0230349 A1 | 8/2017 | Gaur et al. | |
| 2018/0026856 A1 | 1/2018 | Yang et al. | |
| 2018/0189114 A1 | 7/2018 | Jiang et al. | |
| 2019/0007949 A1* | 1/2019 | Myers, III | H04W 36/305 |

OTHER PUBLICATIONS

Naylor et al., "Optimise Microservice Deployment for System Performance," Sep. 14, 2018, 1 page.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

DISTRIBUTED SYSTEM DEPLOYMENT

BACKGROUND

The present disclosure relates generally to distributed systems, and more specifically to deployment of a distributed system across a plurality of machines.

SUMMARY

The present invention provides a computer-implemented method, system, and computer program product for configuring deployment of a distributed system across a plurality of machines of a network. The method may include obtaining network information describing network communication characteristics between a plurality of machines of a network. The method may also include obtaining inter-container communication information describing at least one characteristic of communication between pairs of machines of the plurality of machines for a predetermined time period. The method may also include determining a cost function, the cost function mapping a potential container deployment configuration to an expected communication time, based on the network information and the inter-container communication. The method may also include processing the cost function with an optimization algorithm. The method may also include, in response to the processing, identifying a container deployment configuration having an associated cost that meets a cost requirement.

The system may have one or more computer processors and may be configured to obtain network information describing network communication characteristics between a plurality of machines of a network. The system may also be configured to obtain inter-container communication information describing at least one characteristic of communication between pairs of machines of the plurality of machines for a predetermined time period. The system may also be configured to determine a cost function, the cost function mapping a potential container deployment configuration to an expected communication time, based on the network information and the inter-container communication. The system may also be configured to process the cost function with an optimization algorithm. The system may also be configured to, in response to the processing, identify a container deployment configuration having an associated cost that meets a cost requirement.

The computer program product may include a computer readable storage medium having program instructions embodied therewith, the program instructions executable by a server to cause the server to perform a method. The method may include obtaining network information describing network communication characteristics between a plurality of machines of a network. The method may also include obtaining inter-container communication information describing at least one characteristic of communication between pairs of machines of the plurality of machines for a predetermined time period. The method may also include determining a cost function, the cost function mapping a potential container deployment configuration to an expected communication time, based on the network information and the inter-container communication. The method may also include processing the cost function with an optimization algorithm. The method may also include, in response to the processing, identifying a container deployment configuration having an associated cost that meets a cost requirement.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
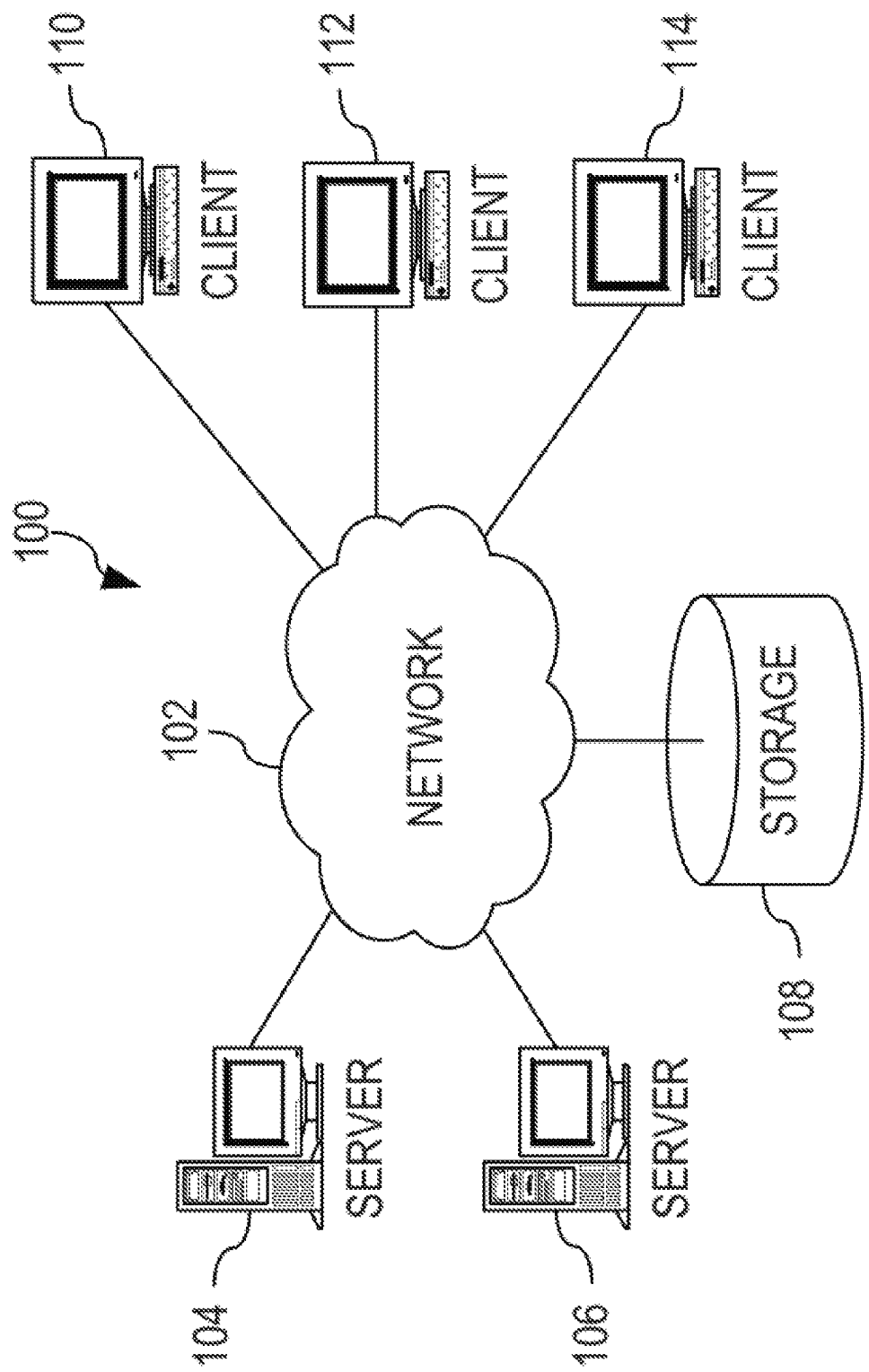
FIG. 1 depicts a schematic diagram of an example distributed system, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates generally to distributed systems, and more specifically to deployment of a distributed system across a plurality of machines. While the present disclosure is not necessarily limited to such applications, various aspects of the disclosure may be appreciated through a discussion of various examples using this context.

Distributed systems may be created to host software services across a plurality of machines (such as in the cloud), due to numerous advantages over a traditional on-site deployment. However, when hosting software services across a plurality of machines, it may be important that the services run efficiently and effectively.

These software services may consist of a plurality of microservices, and each microservice may run in their own containers and may also communicate with each other (e.g., using representational state transfer (REST), hypertext transfer protocol (HTTP), etc.). Different microservices may communicate more than others (e.g., depending on the architecture of the overall system). The plurality of machines used to host to containers may host more than one container on each machine. However, ping times between the various different machines may be significantly different, thus resulting in varying latency between machines when microservices interact with each other. This varying latency may have large effects on overall system performance.

The present disclosure provides a computer-implemented method, system, and computer program product for deployment of a distributed system across a plurality of machines. More specifically, containers may be deployed on machines based on network information describing network communication characteristics between the plurality of machines, thus maximizing overall system performance. Such concepts may use a combination of cross-container metrics, statistical analysis thereof, and an optimization heuristic. Embodiments may therefore provide a tool through which the latency within a cloud system can be minimized to increase the performance of a service. This may lead to increased throughput of the entire system, as well as a better customer experience.

Based on network information and inter-container communication information (obtained for an existing deployed configuration for example), embodiments may identify a preferred or optimal deployment architecture for improved performance.

Network information may be obtained, for example, by measuring at least one of ping time, data transfer rate and bandwidth between pairs of machines. By obtaining the network information from an actual deployment (e.g. a test deployment or a production deployment), accurate and relevant information may be obtained so as to improve analysis and results.

Obtaining inter-container communication information may include deploying microservice containers across the plurality of machines in a test deployment configuration. Communication between pairs of machines of the plurality of machines may then be monitored for a predetermined time period to determine at least one characteristic of communication between pairs of machines of the plurality of machines for the predetermined time period. For instance, an initial test deployment configuration may be implemented and then monitored to obtain accurate information about communication between pairs of machines. By obtaining the inter-container communication information from an actual deployment, more accurate and relevant information may be obtained so as to improve analysis and results.

In some embodiments, an existing production deployment may be monitored to obtain inter-container communication information. Monitoring such a production deployment may, for example, provide more accurate information than a test deployment.

Inter-container communication information may include information describing an amount of data transferred between pairs of machines of the plurality of machines for the predetermined time period (e.g., an hour, a day, a week, a month, etc.). By way of example, inter-container communication information may include information describing at least one of: an average frequency of requests and responses between pairs of machines of the plurality of machines for the predetermined time period, content-length headers of requests and responses between pairs of machines of the plurality of machines for the predetermined time period, and an average payload size of requests and responses between pairs of machines of the plurality of machines for the predetermined time period. Information about an average frequency of requests and responses may provide an indication of the relative importance of certain inter-container interactions or links. Similarly, information about average payload size may provide an indication of the relative requirements of certain inter-container links. Such information be leveraged to ensure that certain inter-containers communication links are prioritized in deployment configurations, for example.

Preferred embodiments may further include determining the cost requirement based on at least one of: a user input signal, and a control signal from a performance control component. Such embodiments may also include: determining, with the performance control component, a minimum performance requirement, and generating a control signal representative of the minimum performance requirement. Embodiments may therefore facilitate adaptation of the cost requirement according to a user's preference and/or a determination made by a controller (or expert user). This may enable the cost requirement to be set and/or modified according to specific target needs.

By way of example, the optimization algorithm may include at least one of: a greedy algorithm, an ant colony algorithm, a simulated annealing algorithm, a genetic algorithm, and a tabu search. A wide range of known or conventional optimization concepts or algorithms may therefore be employed by embodiments. This may help to reduce implementation complexity and/or cost.

In the context of the present application, where embodiments of the present invention constitute a method, it should be understood that such a method may be a process for execution by a computer, i.e. may be a computer-implementable method. The various steps of the method may therefore reflect various parts of a computer program (e.g., various parts of one or more algorithms).

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed are concepts for deploying containers on machines based on ping time in order to minimize latency across a system, thus maximizing overall system performance. Such concepts may use a combination of cross-container metrics, statistical analysis thereof, and an optimization heuristic. Embodiments may therefore provide a tool through which the latency within a cloud system can be minimized to increase the performance of a service. This may lead to increased throughput of the entire system, as well as a better customer experience.

Thus, embodiments may provide a computer-implemented method for reducing latency in a system by finding an optimal deployment configuration (e.g. locations) of containers for minimal ping time between containers.

For example, in some embodiments, a large matrix of cross-container networking metrics may be employed, such as ping time, data transfer rates, and/or inter-container bandwidth, in order to optimise the configuration of an entire system deployment for performance. Such optimization may employ an advanced optimization technique (e.g., an Ant Colony Optimization algorithm).

Embodiments may, for example, seek to find the best deployment architecture for performance with little consideration for the speed of an initial test deployment configuration.

In some embodiments, based on network information and the inter-container communication information (e.g., obtained for an existing deployment configuration), a cost function mapping a potential container deployment configuration to an expected communication time may be determined. Using this cost function, an optimization algorithm may be employed to identify a container deployment configuration having an associated cost that meets a cost requirement.

Purely by way of example, an optimization algorithm employed by a proposed embodiment may include a greedy algorithm, an ant colony algorithm, or a combination thereof. Embodiments may therefore employ various techniques for optimising the cost function, thus reducing implementation complexity and/or cost.

Referring now to FIG. 1, a schematic diagram of an exemplary distributed system 100 is depicted, according to some embodiments. In some embodiments, the distributed system 100 includes a network of computers in which aspects of the illustrative embodiments may be implemented. The distributed system 100 may contain at least one network 102, which may be the medium used to provide communication links between various devices and computers (e.g., client 110, client 112, client 114, server 104, server 106, etc.) connected together within the distributed data processing system 100. The network 102 may include connections, such as wire, wireless communication links, or fiber optic cables.

In some embodiments, a first server 104 and a second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. In some embodiments, clients 110, 112, and 114 are clients to the first server 104. The distributed processing system 100 may include additional servers, clients, and other devices not shown.

In some embodiments, the distributed system 100 may be the Internet, and the network 102 may represent a worldwide collection of networks and gateways that use a Transmission Control Protocol/Internet Protocol (TCP/IP) suite of protocols to communicate with one another. For example, at the heart of the Internet may be a backbone of high-speed data communication lines between major nodes or host computers, consisting of thousands of commercial, governmental, educational and other computer systems that route data and messages. In some embodiments, the distributed system 100 is implemented to include a number of different types of networks, such as, for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
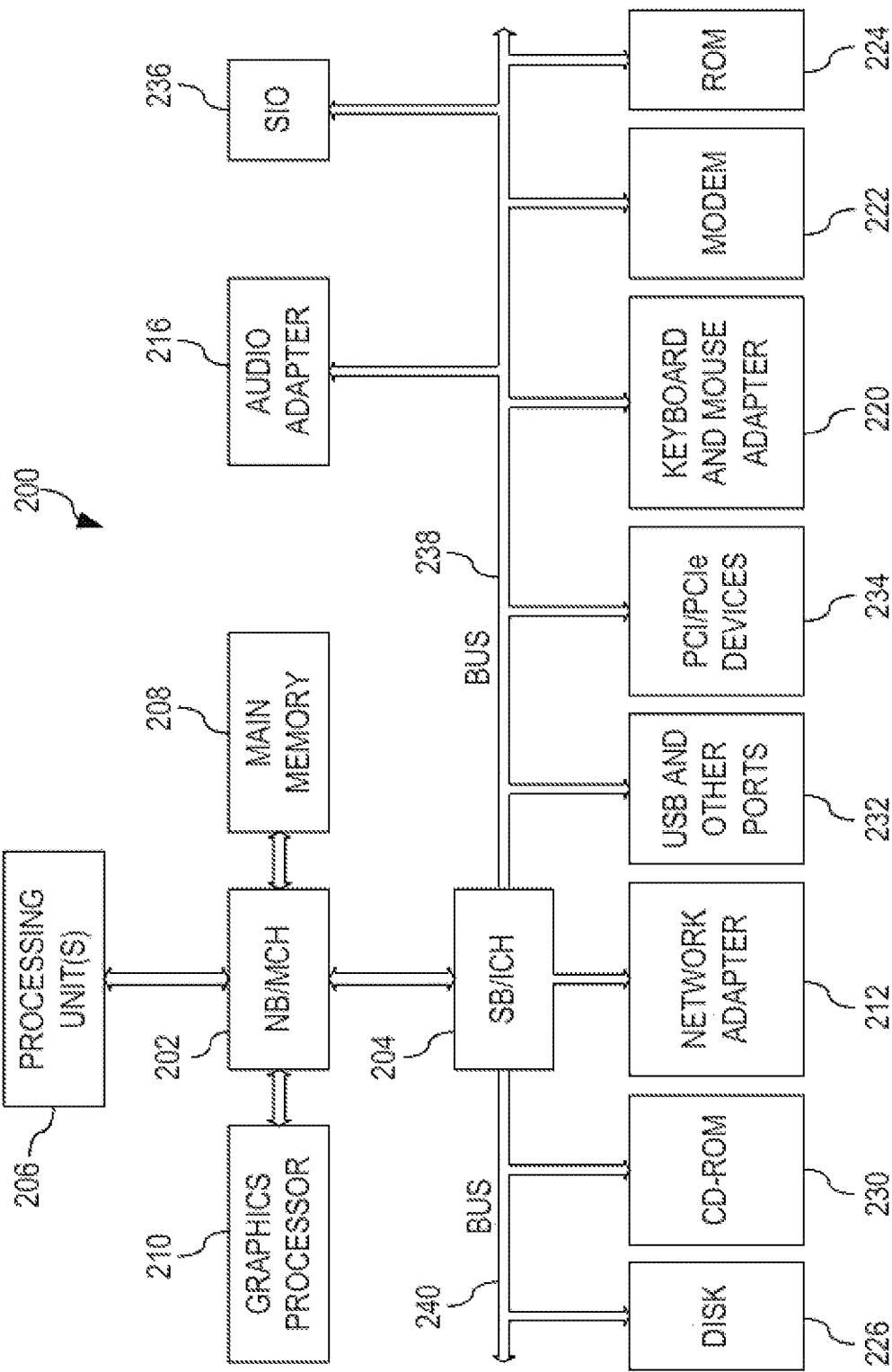
FIG. 2 depicts a block diagram of an example system, according to some embodiments.

Referring to FIG. 2, a block diagram of an example system 200 in which aspects of the illustrative embodiments may be implemented is depicted, according to some embodiments. The system 200 is an example of a computer, such as client 110 in FIG. 1, in which computer usable code or instructions implementing the processes for illustrative embodiments of the present invention may be located.

In some embodiments, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 may be connected to NB/MCH 202. In some embodiments, the graphics processor 210 may be connected to the NB/MCH 202 through an accelerated graphics port (AGP).

In some embodiments, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 may connect to the SB/ICH 204 through first bus 238 and second bus 240. PCI/PCIe devices 234 may include, for example, Ethernet adapters, add-in cards, and PC cards for notebook computers. In some embodiments, PCI may use a card bus controller, while PCIe may not. In some embodiments, ROM 224 may be, for example, a flash basic input/output system (BIOS).

In some embodiments, the HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

In some embodiments, an operating system runs on the processing unit 206. The operating system may coordinate and provide control of various components within the system 200 in FIG. 2. In some embodiments, as a client, the operating system may be a commercially available operating system. An object-oriented programming system, such as the Java™ programming system, may run in conjunction with the operating system and provide calls to the operating system from Java™ programs or applications executing on system 200.

In some embodiments, the system 200 may be a symmetric multiprocessor (SMP) system including a plurality of processors in processing unit 206. In some embodiments, a single processor system may be employed.

In some embodiments, instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

In some embodiments, a bus system, such as first bus 238 or second bus 240, may include one or more buses. The bus system may be implemented using any type of communication fabric or architecture that provides for a transfer of data between different components or devices attached to the fabric or architecture. A communication unit, such as the modem 222 or the network adapter 212, may include one or more devices used to transmit and receive data. A memory may be, for example, main memory 208, ROM 224, or a cache such as found in NB/MCH 202.

In some embodiments, the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

In some embodiments, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments may provide a method and system for configuring deployment of microservice containers across a plurality of machines of a network. Such embodiments may identify one or more preferred or optimal configurations which ensure a performance requirement (such as a maximum acceptable communication time between containers or microservices) is met. In some embodiments, such identification of deployment configurations may employ known optimization techniques or algorithms in combination with a cost function that accounts for (i) network information describing network communication characteristics between the plurality of machines (e.g., ping time, data transfer rate(s) and/or bandwidth between the plurality of machines) and (ii) inter-container communication information (e.g., describing an amount of information/data communicated between pairs of machines).

Figure 3:
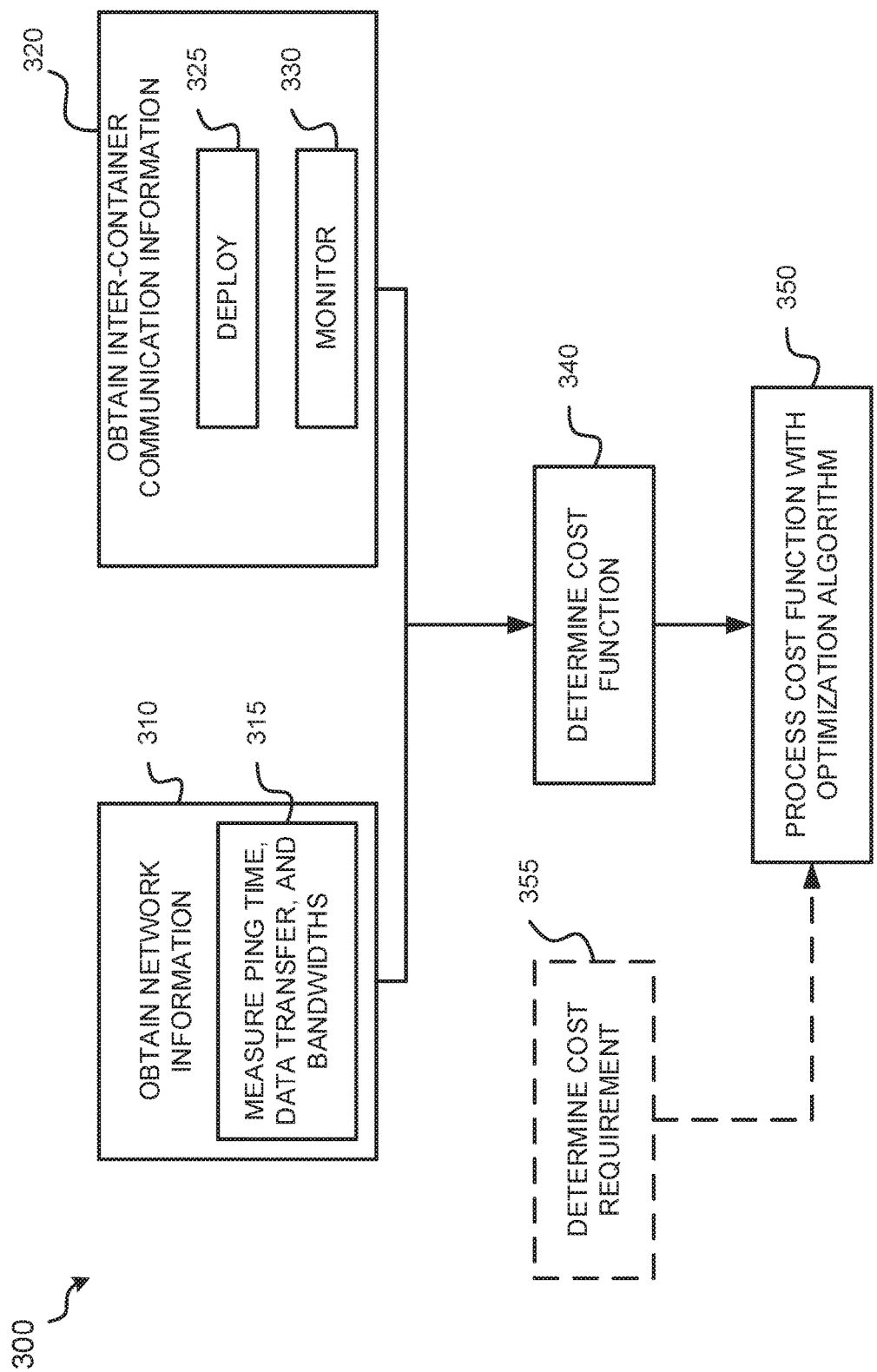
FIG. 3 depicts a flow chart of a method for configuring deployment of containers across a plurality of machines of a network, according to some embodiments.

Referring now to FIG. 3, an exemplary embodiment of a flow chart of a method 300 for configuring deployment of microservice containers across a plurality of machines of a network is depicted, according to some embodiments.

In some embodiments, method 300 includes obtaining network information describing measurements of ping time and bandwidth between the plurality of machines, at operation 310. In some embodiments, operation 310 may include measuring ping time and bandwidth between pairs of machines of the plurality of machines, in operation 315.

Method 300 may include operation 320 to obtain inter-container communication information describing an amount of information communicated between pairs of machines, of the plurality of machines, for a predetermined time period. In some embodiments, operation 320 of obtaining inter-container communication information may include deploying the microservice containers across the plurality of machines in a test deployment configuration (operation 325), and monitoring communication between pairs of machines of the plurality of machines (operation 330). In some embodiments, the monitoring may be for a predetermined time period to determine at least one characteristic of communication between pairs of machines of the plurality of machines for the predetermined time period (e.g., an hour, day, week, etc.).

In some embodiments, the inter-container communication information includes information describing an amount of data transferred between pairs of machines of the plurality of machines for the predetermined time period. Operation 330 of monitoring communication, therefore, may include monitoring the frequency and payload size of requests and responses between pairs of machines of the plurality of machines for the predetermined time period.

Furthermore, in some embodiments, the inter-container communication information obtained may also include information describing content-length headers of requests and responses between pairs of machines of the plurality of machines for the predetermined time period.

Based on the obtained network information (from operation 310) and the inter-container communication information (from operation 320), a cost function may be determined in operation 340. The cost function may map a potential container deployment configuration to an expected communication time.

In some embodiments, method 300 includes operation 350 to process the cost function with an optimization algorithm to identify a container deployment configuration having an associated cost that meets a cost requirement. For example, the optimization algorithm may employ a greedy algorithm (and may follow the problem-solving heuristic of making a locally optimal choice as each stage with the intent of finding a global optimum).

In is noted that, in some embodiments, the cost requirement may be determined in a separate operation (operation 355), prior to undertaking operation 350 of processing the cost function with an optimization algorithm. In some embodiments, operation 355 may include determining the cost requirement based on at least one of: a user input signal; and a control signal from a performance control component. For instance, a performance control component may be configured to determine a minimum performance requirement and then generate a control signal representative of the minimum performance requirement. Based on such a control signal, a cost requirement may then be determined.

To aid further understanding and appreciation of the proposed concept(s), an exemplary implementation will now be described. Such an implementation is purely by way of demonstrating process steps and algorithms that may be employed, and it should be understood that other implementations are not limited to such process steps and algorithms only.

Firstly, in some embodiments, the ping time between machines i and j is acquired, and this ping time is represented as $P_{ij}$. The bandwidth between machines i and j may be acquired for every machine to which containers can be deployed. In some embodiments, the bandwidth between machines i and j is represented as $B_{ij}$. Further, the data transfer rate between machines i and j may be acquired for each pair of machines. The data transfer rate between machines i and j may be represented as $D_{ij}$. By way of example, $P_{ij}$, $B_{ij}$ and $D_{ij}$ may be acquired by performing ping tests, bandwidth tests, and data transfer tests on a test deployment configuration of the machines. In some embodiments, containers employed in such a test may be the full containers as used for a production deployment configuration. In some embodiments, lightweight containers which are able to communicate with each other to perform the tests may be used. For instance, in some embodiments, only a single container per machine may be used, and then tests may be run on all possible pairs of machines.

It is noted that this is computationally feasible because there are only 'n choose 2' (i.e., $\binom{n}{2}$) ping and bandwidth tests required, where n is the number of machines to which containers can be deployed.

In some embodiments, the system may then be deployed in a normal manner (i.e. in an initial deployment configuration). Cross-container HTTP metrics (e.g. average frequency of requests and responses, data transfer between containers, and content-length headers) may be recorded for the deployed configuration over a predetermined time period. In some embodiments, such a time period is chosen so that it is assumed to be representative of long-term running of the system (e.g. an entire day/week) so as to capture the effects of variation in demand at different times. This may provide information about an expected number of requests, between any two containers.

In some embodiments, a cost function, F, may be created, which maps a potential container deployment scheme to the expected total in-flight request and response time across the entire system. The cost function f may be approximated for any given deployment scheme using P, D, B, R, and a performance criticality rating, C, for any given request/route. By way of example, a general cost function may be as follows:

$$\text{cost}(E) = \sum_{e \in E} \left( R(e)P(e) + \frac{D(e)}{B(e)} \right)$$

This example function may consider a system deployment to be a directed graph with edge set E.

However, it is to be understood that other cost functions may be employed, such as other cost functions which increase cost with an increase in R, P, and D, and decrease cost with an increase in B.

In some embodiments, a system architect can set the performance criticality rating, C, according to perceived performance criticality of the request. For example, the system architect may consider logging a performance to be unimportant in comparison to backend user interface calls.

Using this cost function C, an optimization heuristic may then be employed in order to seek out a solution (i.e. deployment configuration) with sufficiently low cost, and therefore improved overall system performance.

An example of such an optimization scheme may be a greedy algorithm, where the solution is found by incrementally adding each container to a machine, according to a minimised anticipated increase in the cost function C. It is noted the such incremental approaches may lend themselves to more advanced optimization algorithms, such as ant colony methods. In particular, ant colony algorithms may be particularly well suited, due to their ability to adapt to changing microservice topologies and shifting tides in client usage of a service.

Figure 4:
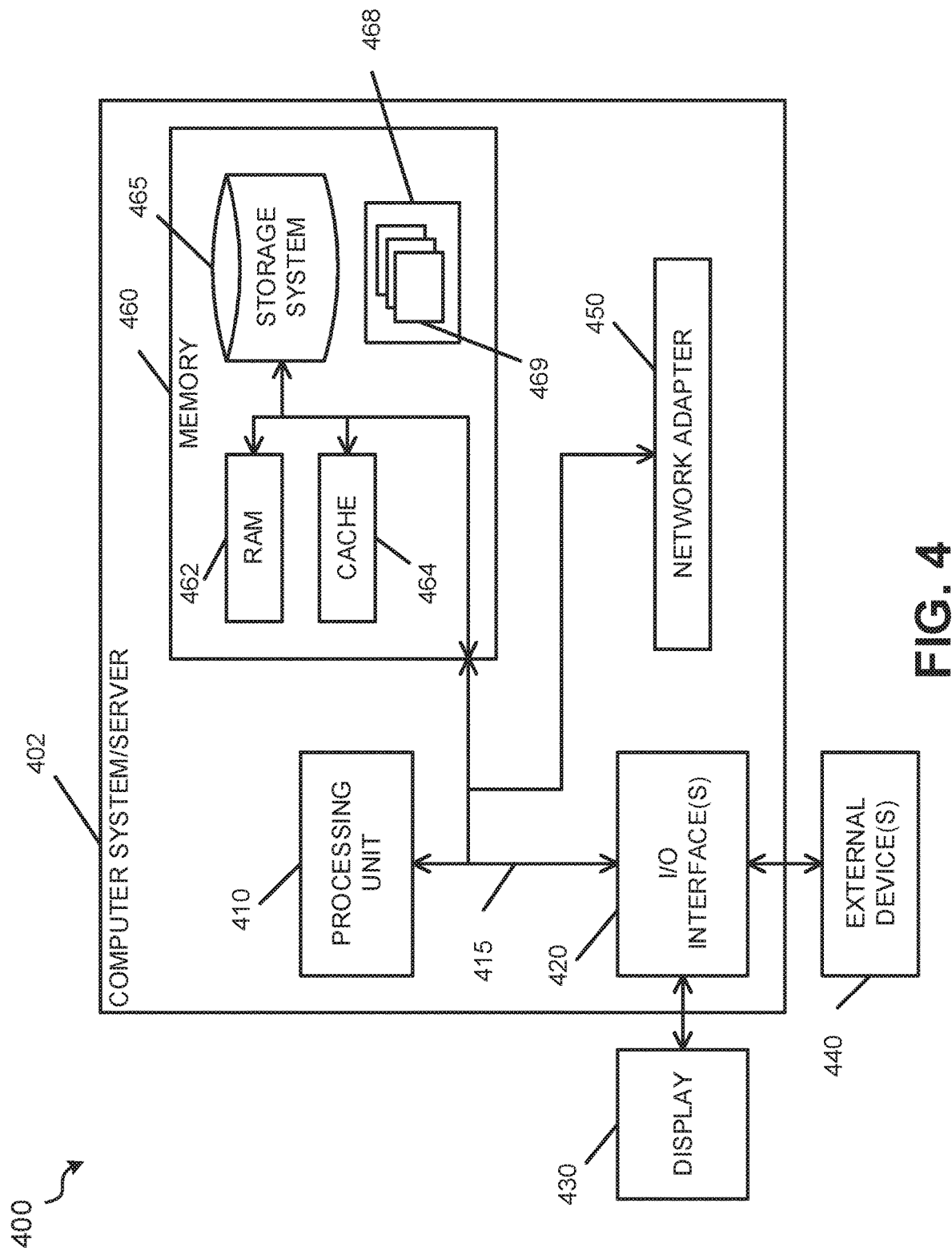
FIG. 4 depicts a block diagram of a sample computer system, according to some embodiments.

Referring now to FIG. 4, computer system 400 is a computer system/server 402 is shown in the form of a general-purpose computing device, according to some embodiments. In some embodiments, computer system 400 may be a computing device of the distributed system 100 (FIG. 1), in accordance with an embodiment of the present invention. The components of computer system/server 402 may include, but are not limited to, one or more processors or processing units 410, a system memory 460, and a bus 415 that couples various system components including system memory 460 to processor 410.

Bus 415 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 460 can include computer system readable media in the form of volatile memory, such as random-access memory (RAM) 462 and/or cache memory 464. Computer system/server 402 may further include other removable/non-removable, volatile/non-volatile computer system storage media. By way of example only, storage system 465 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 415 by one or more data media interfaces. As will be further depicted and described below, memory 460 may include at least one program product having a set (e.g., at least one) of program modules that are configured to carry out the functions of embodiments of the disclosure.

Program/utility 468, having a set (at least one) of program modules 469, may be stored in memory 460 by way of example, and not limitation, as well as an operating system, one or more application programs, other program modules, and program data. Each of the operating system, one or more application programs, other program modules, and program data or some combination thereof, may include an implementation of a networking environment. Program modules 469 generally carry out the functions and/or methodologies of embodiments of the invention as described herein.

Computer system/server 402 may also communicate with one or more external devices 440 such as a keyboard, a pointing device, a display 430, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 420. Still yet, computer system/server 402 can communicate with one or more networks such as a local area network (LAN), a general wide area network (WAN), and/or a public network (e.g., the Internet) via network adapter 450. As depicted, network adapter 450 communicates with the other components of computer system/server 402 via bus 415. It should be understood that although not shown, other hardware and/or software components could be used in conjunction with computer system/server 402. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
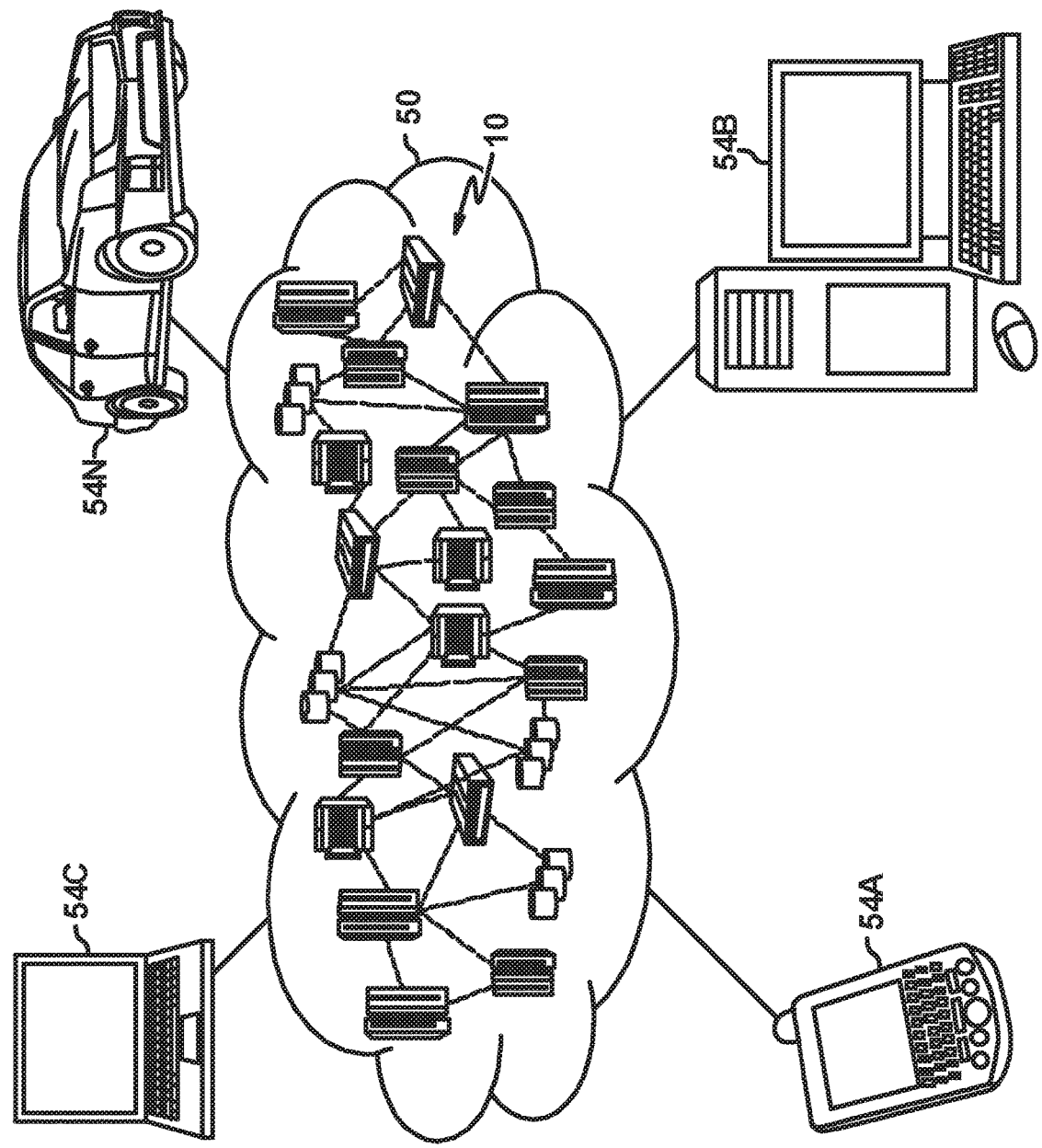
FIG. 5 depicts a cloud computing environment, according to some embodiments.

Referring now to FIG. 5, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
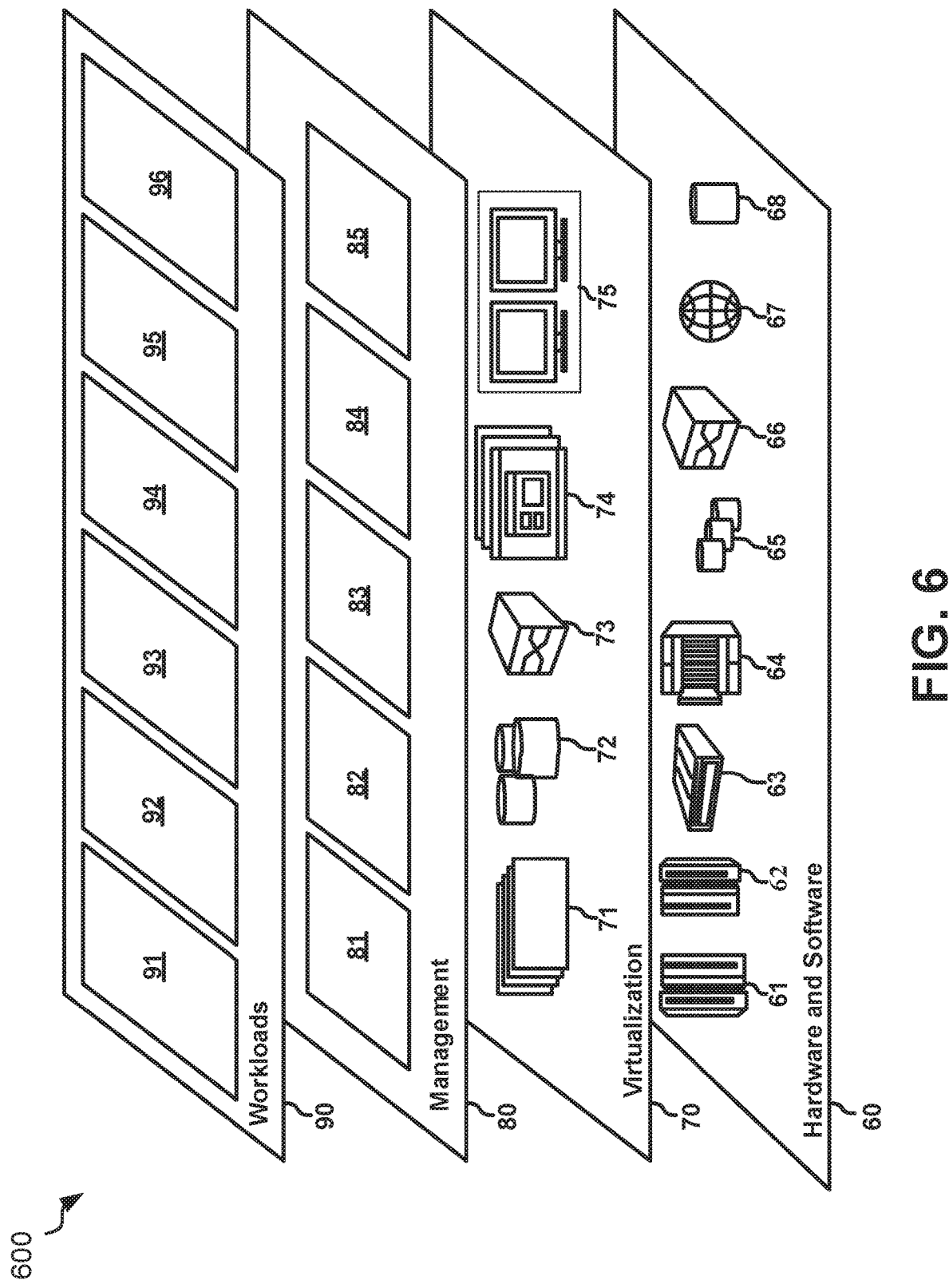
FIG. 6 depicts abstraction model layers, according to some embodiments.

Referring now to FIG. 6, a set of functional abstraction layers 600 provided by cloud computing environment 50 (FIG. 5) is shown, according to some embodiments. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed system deployment 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining network information describing network communication characteristics between a plurality of machines of a network;
    obtaining inter-container communication information describing at least one characteristic of communication between pairs of machines of the plurality of machines for a predetermined time period;
    determining a cost function, the cost function mapping a potential container deployment configuration to an expected communication time, based on the network information and the inter-container communication;
    processing the cost function with an optimization algorithm; and
    in response to the processing, identifying a container deployment configuration having an associated cost that meets a cost requirement.

2. The method of claim 1, wherein obtaining the network information comprises:
    measuring at least one of ping time, data transfer rate, and bandwidth between the pairs of machines of the plurality of machines.

3. The method of claim 1, wherein obtaining the inter-container communication information comprises:
    deploying microservice containers across the plurality of machines in a test deployment configuration;
    monitoring communication between the pairs of machines for the predetermined time period; and
    in response to the monitoring, determining at least one characteristic of communication between the pairs of machines for the predetermined time period.

4. The method of claim 1, wherein the inter-container communication information comprises information describing an amount of data transferred between the pairs of machines for the predetermined time period.

5. The method of claim 1, wherein the inter-container communication information comprises information describing at least one of:
    an average frequency of requests and responses between the pairs of machines for the predetermined time period;
    content-length headers of the requests and responses between the pairs of machines for the predetermined time period; and
    an average payload size of the requests and responses between the pairs of machines for the predetermined time period.

6. The method of claim 1, further comprising:
    determining the cost requirement based on at least one of: a user input signal and a control signal from a performance control component.

7. The method of claim 6, further comprising:
    determining, with the performance control component, a minimum performance requirement; and
    generating a control signal representative of the minimum performance requirement.

8. The method of claim 1, wherein the optimization algorithm comprises at least one of:
    a greedy algorithm;
    an ant colony algorithm;
    a simulated annealing algorithm;
    a genetic algorithm; and
    a tabu search.

9. A system having one or more computer processors, the system configured to:
    obtain network information describing network communication characteristics between a plurality of machines of a network;
    obtain inter-container communication information describing at least one characteristic of communication between pairs of machines of the plurality of machines for a predetermined time period;
    determine a cost function, the cost function mapping a potential container deployment configuration to an expected communication time, based on the network information and the inter-container communication;
    process the cost function with an optimization algorithm; and
    in response to the processing, identify a container deployment configuration having an associated cost that meets a cost requirement.

10. The system of claim 9, wherein obtaining the network information comprises:
    measuring at least one of ping time, data transfer rate, and bandwidth between the pairs of machines of the plurality of machines.

11. The system of claim 9, wherein obtaining the inter-container communication information comprises:
    deploying microservice containers across the plurality of machines in a test deployment configuration;
    monitoring communication between the pairs of machines for the predetermined time period; and
    in response to the monitoring, determining at least one characteristic of communication between the pairs of machines for the predetermined time period.

12. The system of claim 9, wherein the inter-container communication information comprises information describing an amount of data transferred between the pairs of machines for the predetermined time period.

13. The system of claim 9, wherein the inter-container communication information comprises information describing at least one of:
    an average frequency of requests and responses between the pairs of machines for the predetermined time period;
    content-length headers of the requests and responses between the pairs of machines for the predetermined time period; and
    an average payload size of the requests and responses between the pairs of machines for the predetermined time period.

14. The system of claim 9, further configured to:
    determine the cost requirement based on at least one of: a user input signal and a control signal from a performance control component.

15. The system of claim 14, further configured to:
determine, with the performance control component, a minimum performance requirement; and
generate a control signal representative of the minimum performance requirement.

16. The system of claim 9, wherein the optimization algorithm comprises at least one of:
a greedy algorithm;
an ant colony algorithm;
a simulated annealing algorithm;
a genetic algorithm; and
a tabu search.

17. A computer program product comprising a computer readable storage medium having program instructions embodied therewith, the program instructions executable by a server to cause the server to perform a method, the method comprising:
obtaining network information describing network communication characteristics between a plurality of machines of a network;
obtaining inter-container communication information describing at least one characteristic of communication between pairs of machines of the plurality of machines for a predetermined time period;
determining a cost function, the cost function mapping a potential container deployment configuration to an expected communication time, based on the network information and the inter-container communication;
processing the cost function with an optimization algorithm; and
in response to the processing, identifying a container deployment configuration having an associated cost that meets a cost requirement.

18. The computer program product of claim 17, wherein obtaining the network information comprises:
measuring at least one of ping time, data transfer rate, and bandwidth between the pairs of machines of the plurality of machines.

19. The computer program product of claim 17, wherein obtaining the inter-container communication information comprises:
deploying microservice containers across the plurality of machines in a test deployment configuration;
monitoring communication between the pairs of machines for the predetermined time period; and
in response to the monitoring, determining at least one characteristic of communication between the pairs of machines for the predetermined time period.

20. The computer program product of claim 17, wherein the inter-container communication information comprises information describing an amount of data transferred between the pairs of machines for the predetermined time period.

* * * * *